US012180049B2

(12) United States Patent
Nitta et al.

(10) Patent No.: US 12,180,049 B2
(45) Date of Patent: Dec. 31, 2024

(54) DEVICE AND METHOD FOR TRANSPORTING STAGE ROLL UNIT, AND STAGE ROLL UNIT TRANSPORTING CART

(71) Applicant: MITSUBISHI HEAVY INDUSTRIES MACHINERY SYSTEMS, LTD., Hyogo (JP)

(72) Inventors: Takashi Nitta, Hyogo (JP); Hideki Mizutani, Hyogo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 616 days.

(21) Appl. No.: 17/424,085

(22) PCT Filed: Dec. 5, 2019

(86) PCT No.: PCT/JP2019/047545
§ 371 (c)(1),
(2) Date: Jul. 19, 2021

(87) PCT Pub. No.: WO2020/153008
PCT Pub. Date: Jul. 30, 2020

(65) Prior Publication Data
US 2022/0098015 A1 Mar. 31, 2022

(30) Foreign Application Priority Data
Jan. 23, 2019 (JP) ................................ 2019-009457

(51) Int. Cl.
*B66F 9/065* (2006.01)
*B66F 9/075* (2006.01)
(Continued)

(52) U.S. Cl.
CPC .......... *B66F 9/065* (2013.01); *B66F 9/07586* (2013.01); *B66F 9/20* (2013.01); *B31F 1/26* (2013.01)

(58) Field of Classification Search
CPC .... B62B 5/049; B60S 9/10; B60S 9/11; B60S 9/12; B66F 9/065
See application file for complete search history.

(56) References Cited

U.S. PATENT DOCUMENTS 3,422,929 A * 1/1969 Oja ........................ B62B 5/049 188/23
3,520,547 A * 7/1970 Anthony ............. A47B 91/024 280/43.24
(Continued)

FOREIGN PATENT DOCUMENTS

JP 528967 A 1/1977
JP 740836 A 2/1995
(Continued)

OTHER PUBLICATIONS

Extended European Search Report of European Application No. 19911247.5 mailed Jan. 25, 2022; 7pp.
(Continued)

*Primary Examiner* — Jeffrey J Restifo
(74) *Attorney, Agent, or Firm* — HAUPTMAN HAM, LLP

(57) ABSTRACT

Provided are: a device and a method for transporting a stage roll unit; and a stage roll unit transporting cart. The present invention comprises: a loading deck having accommodating portions for accommodating a stage roll unit; a first vehicle wheel that can move the loading deck in an X-direction in which the stage roll unit is replaced; a second vehicle wheel that can move the loading deck in a Y-direction crossing the X-direction; a first raising/lowering device that can raise/lower the first vehicle wheel with respect to a traveling
(Continued)

surface; and a moving device which is disposed on the traveling surface side, and which raises the first vehicle wheel from the traveling surface by the first raising/lowering device, and can move the loading deck and the first raising/lowering device in the Y-direction while the second vehicle wheel is grounded to the traveling surface.

9 Claims, 11 Drawing Sheets

(51) Int. Cl.
*B66F 9/20* (2006.01)
*B31F 1/26* (2006.01)

(56) References Cited

U.S. PATENT DOCUMENTS 3,715,015 A * 2/1973 Morris .................... B62B 5/049 248/354.6
3,876,087 A 4/1975 Osta
4,073,369 A * 2/1978 Nordskog ............... B62B 5/049 188/32
4,302,025 A * 11/1981 Waddell .................. B62B 5/049 188/19
4,555,827 A * 12/1985 St. Louis ................ B60B 33/06 16/33
4,627,831 A * 12/1986 Hirakawa ............. B31F 1/2868 156/472
4,655,466 A * 4/1987 Hanaoka ................... B62B 3/02 187/269
4,913,458 A * 4/1990 Hamilton .................. B60S 9/10 348/148
5,035,445 A * 7/1991 Poulin ....................... B60T 1/14 280/79.11
5,323,879 A * 6/1994 Poulin ..................... B62B 5/049 188/19
5,366,231 A * 11/1994 Hung ..................... A47C 7/006 280/87.051
5,398,952 A * 3/1995 Wagner .................. B62D 63/06 280/43.24
5,431,254 A * 7/1995 Kramer ................... B62B 5/049 280/43.24
5,628,522 A * 5/1997 Hall ........................ B60B 33/06 280/46
5,722,641 A * 3/1998 Martin ...................... B60S 9/12 254/423
5,845,914 A * 12/1998 Lenkman ............... B60G 99/00 280/43.23
6,860,496 B2 * 3/2005 Novak .................... B62B 5/049 414/469
8,365,353 B2 * 2/2013 Block ................. B60B 33/0028 16/35 R
8,511,693 B2 * 8/2013 Gass ..................... B62B 5/0083 280/43.24
9,376,131 B2 * 6/2016 Lenkman .................. B62B 3/04
10,427,701 B1 * 10/2019 Brede ....................... B62B 3/02
2007/0080030 A1 * 4/2007 Kramer ..................... B60T 1/14 188/5
2007/0102599 A1 * 5/2007 Lin ....................... B62B 5/0083 248/129
2008/0056871 A1 * 3/2008 Morgan ................ B62B 3/0643 414/800
2009/0127531 A1 * 5/2009 Bakshi ...................... B60S 9/12 345/173
2010/0137880 A1 * 6/2010 Nahum .................. A61B 34/70 606/130
2014/0316654 A1 * 10/2014 Griffiths ................... B62D 6/10 701/41
2014/0334910 A1 * 11/2014 Raasch ................... B62B 5/049 414/800
2017/0101118 A1 * 4/2017 Johnson .................... B62B 3/10
2017/0282949 A1 * 10/2017 Gonzalez ................ B62B 3/005
2017/0369088 A1 * 12/2017 Ingram ................... B62B 5/049
2019/0381756 A1 12/2019 Nitta
2022/0071718 A1 * 3/2022 Fukuno .................. A61B 34/30
2022/0081268 A1 * 3/2022 Davis ........................ B66F 3/46
2022/0250591 A1 * 8/2022 Chuol ..................... B62B 3/104
2022/0401161 A1 * 12/2022 Chappuis ............... A61B 90/50

FOREIGN PATENT DOCUMENTS

JP 2018118390 A 8/2018
WO 2009107439 A1 9/2009

OTHER PUBLICATIONS

ISR and WO for International Application No. PCT/JP2019/047545 issued Mar. 3, 2020, 10 pp.

* cited by examiner

DEVICE AND METHOD FOR TRANSPORTING STAGE ROLL UNIT, AND STAGE ROLL UNIT TRANSPORTING CART

RELATED APPLICATIONS

The present application is a National Phase of International Application Number PCT/JP2019/047545 filed Dec. 5, 2019 and claims priority to Japanese Application Number 2019-009457 filed Jan. 23, 2019.

TECHNICAL FIELD

The present invention relates to an apparatus and method for transporting a corrugating roll unit composed of upper and lower corrugating rolls that form a medium by corrugating medium paper in a single facer that manufactures a single-faced cardboard sheet by bonding a liner to a corrugated medium, and a corrugating roll unit transporting carriage which is used in the corrugating roll unit transporting apparatus.

BACKGROUND ART

A corrugating machine as a cardboard sheet manufacturing apparatus includes a single facer that forms a single-faced cardboard sheet and a double facer that forms a double-faced cardboard sheet by bonding bottom liner paper to a single-faced cardboard sheet. The single facer processes medium paper (a medium) into a corrugated shape and bonds a top liner to the corrugated medium paper to form the single-faced cardboard sheet, and the double facer bonds a bottom liner to the single-faced cardboard sheet to form a double-faced cardboard sheet. The continuous double-faced cardboard sheet manufactured by the double facer is cut to a predetermined width by a slitter scorer and cut to a predetermined length by a cutoff device, so that cardboard sheets are formed.

In the single facer of the corrugating machine, the top liner heated by a preheater is transferred to a nip portion between a pressurizing belt and an upper corrugating roll, and on the other hand, the medium paper heated by a preheater is processed into a corrugated shape at the meshing portion between the upper corrugating roll and a lower corrugating roll, whereby a medium is formed, and after an adhesive is applied to a top portion of each corrugation of the medium, the medium is transferred to the nip portion. Then, at the nip portion, the medium is bonded to the top liner, whereby a single-faced cardboard sheet is formed.

In the single facer, in order to manufacture a plurality of types of mediums having different wave shapes, a plurality of types of upper and lower corrugating rolls are prepared according to the types of mediums to be manufactured, and a corrugating roll unit composed of upper and lower corrugating rolls can be replaced with respect to the single facer. In this case, a transporting carriage with the corrugating roll unit mounted thereon moves to the vicinity of the single facer and is positioned at a predetermined replacement position, and then a replacement operation of the corrugating roll unit with respect to the single facer is carried out. As the corrugating roll unit transporting apparatus, there is a corrugating roll unit transporting apparatus disclosed in PTL 1 below. In the corrugating roll unit transporting apparatus disclosed in PTL 1, a mounting base having an accommodation portion for accommodating a corrugating roll unit can be moved by a movement unit, and as the movement unit, there is a movement unit provided with a first traveling device for traveling the mounting base along a first horizontal direction and a second traveling device for traveling the mounting base along a second horizontal direction.

CITATION LIST

Patent Literature

[PTL 1] Japanese Unexamined Patent Application Publication No. 2018-118390

SUMMARY OF INVENTION

Technical Problem

As described above, a plurality of types of corrugating roll units are prepared according to the types of mediums having different wave shapes, and each corrugating roll unit is stored in a predetermined storage place in a state of being mounted on a transporting carriage. Therefore, the transporting carriages are required by the number of the types of corrugating roll units. Since the corrugating roll unit transporting apparatus of PTL 1 includes a movement unit in which the mounting base moves in two directions, there is a problem in that a structure becomes complicated and a manufacturing cost increases.

The present invention is to solve the problem described above, and has an object to provide an apparatus and method for transporting a corrugating roll unit and a corrugating roll unit transporting apparatus, in which simplification of a structure and a cost reduction are attained.

Solution to Problem

In order to achieve the above object, according to an aspect of the present invention, there is provided a corrugating roll unit transporting apparatus including: a mounting base having an accommodation portion accommodating a corrugating roll unit; a first wheel capable of moving the mounting base along a first horizontal direction that is a replacement direction of the corrugating roll unit; a second wheel capable of moving the mounting base along a second horizontal direction intersecting the first horizontal direction; a first lifting device capable of raising and lowering the first wheel with respect to a traveling surface; and a movement unit that is disposed on the traveling surface side and is capable of moving the mounting base and the first lifting device along the second horizontal direction in a state where the first wheel is raised from the traveling surface by the first lifting device and the second wheel is grounded on the traveling surface.

Therefore, the movement unit disposed on the traveling surface side can move the mounting base and the first lifting device along the second horizontal direction in a state where the first wheel is raised from the traveling surface by the first lifting device and the second wheel is grounded on the traveling surface. Therefore, it is not necessary to provide a movement unit at the mounting base, and thus the simplification of a structure and a cost reduction can be attained.

In the corrugating roll unit transporting apparatus according to the present invention, the first wheel is provided on one side in a longitudinal direction of the mounting base, the second wheel is provided on the other side in the longitudinal direction of the mounting base, and the first lifting device raises and lowers the one side in the longitudinal direction of the mounting base, so that the first wheel is capable of being raised and lowered with respect to the traveling surface.

Therefore, when the first lifting device raises one side of the mounting base, the first wheel is separated from the traveling surface, and therefore, the mounting base and the first lifting device can be moved along the second horizontal direction by the second wheel grounded on the traveling surface.

In the corrugating roll unit transporting apparatus according to the present invention, the first lifting device is a fluid pressure cylinder having a rod that moves along a vertical direction, and a locking portion is provided at a tip portion of the rod, while a locked portion to which the locking portion is locked is provided in the mounting base.

Therefore, when the fluid pressure cylinder as the first lifting device is operated to raise the rod, the locking portion is locked to the locked portion of the mounting base, so that the first wheel is separated from the traveling surface, and the first lifting device and the mounting base are integrally connected, so that the mounting base and the first lifting device can be moved along the second horizontal direction by the second wheel.

In the corrugating roll unit transporting apparatus according to the present invention, the locking portion is a protrusion portion having a conical shape, and the locked portion is a recessed portion having a conical shape, into which the locking portion is fitted.

Therefore, when the fluid pressure cylinder is operated to raise the rod, the protrusion portion having a conical shape, as the locking portion, is fitted to the recessed portion having a conical shape, as the locked portion of the mounting base, so that the first wheel is separated from the traveling surface and the first lifting device and the mounting base are integrally connected. At this time, even if the positional relationship between the fluid pressure cylinder and the mounting base is deviated in the horizontal direction, the positional deviation is absorbed by the protrusion portion and the recessed portion each having a conical shape, so that the first lifting device and the mounting base can be appropriately connected.

In the corrugating roll unit transporting apparatus according to the present invention, the movement unit includes a screw shaft that is disposed along the second horizontal direction and rotatably supported, a rotation device capable of rotating the screw shaft, and a moving member that is moved along the second horizontal direction by rotation of the screw shaft, and the first lifting device is provided at the moving member.

Therefore, when the screw shaft is rotated by the rotation device, the moving member moves along the second horizontal direction, so that the first lifting device provided at the moving member moves along the second horizontal direction, and the mounting base connected to the first lifting device can be moved along the second horizontal direction.

In the corrugating roll unit transporting apparatus according to the present invention, the movement unit has a stop switch that stops the first lifting device with respect to the mounting base at a raising and lowering position set in advance, in the second horizontal direction.

Therefore, since the movement unit stops the first lifting device with respect to the mounting base at the raising and lowering position due to the stop switch, the first lifting device can appropriately raise and lower the mounting base.

In the corrugating roll unit transporting apparatus according to the present invention, a first stopper that blocks movement of the corrugating roll unit is provided on the other side in the longitudinal direction of the mounting base, a second stopper capable of blocking the movement of the corrugating roll unit is provided on one side in the longitudinal direction of the mounting base, and an interlocking device that moves the second stopper to a blocking position where the second stopper blocks the movement of the corrugating roll unit and a release position where the second stopper releases the blocking of the movement of the corrugating roll unit, according to an operation of the first lifting device, is provided.

Therefore, coming-off of the corrugating roll unit mounted on the mounting base can be prevented by the first stopper and the second stopper. Further, the second stopper can be moved between the blocking position and the release position by the interlocking device according to the operation of the first lifting device, and at the time of the replacement of the corrugating roll unit, it is not necessary to move the second stopper by another operation, and thus workability can be improved.

In the corrugating roll unit transporting apparatus according to the present invention, the interlocking device has a link, of which an intermediate portion in the longitudinal direction is rotatably supported, and which transmits an operating force of the first lifting device to the second stopper, and when the first wheel is grounded on the traveling surface by the first lifting device, the second stopper moves to the blocking position, and when the first wheel is separated from the traveling surface by the first lifting device, the link rotates, so that the second stopper moves to the release position.

Therefore, in a state where the first wheel is grounded on the traveling surface, the second stopper is located at the blocking position to block the movement of the corrugating roll unit, and when the first wheel is separated from the traveling surface by the first lifting device, the link rotates to move the second stopper to the release position, so that the blocking of the movement of the corrugating roll unit is released, and it is possible to move the second stopper to the blocking position and the release position with a simple configuration, and thus the simplification of a structure can be attained.

In the corrugating roll unit transporting apparatus according to the present invention, the corrugating roll unit transporting apparatus further includes: a second lifting device capable of raising and lowering the second wheel with respect to the traveling surface; and a moving carriage capable of moving the mounting base along the first horizontal direction in a state where the second wheel is raised from the traveling surface by the second lifting device and the first wheel is grounded on the traveling surface.

Therefore, the moving carriage is self-propelled with the second wheel raised from the traveling surface by the second lifting device, so that the mounting base can be moved along the first horizontal direction by the first wheel, and it is not necessary to provide a movement unit at the mounting base, and thus the simplification of a structure and a cost reduction can be attained.

Further, according to another aspect of the present invention, there is provided a method of transporting a corrugating roll unit in a corrugating roll unit transporting carriage which includes a mounting base having an accommodation portion accommodating a corrugating roll unit, a first wheel that is provided at one side in a longitudinal direction of the mounting base and is capable of moving the mounting base along a first horizontal direction that is a replacement direction of the corrugating roll unit, and a second wheel that is provided at the other side in the longitudinal direction of the mounting base and is capable of moving the mounting base along a second horizontal direction intersecting the first horizontal direction, the method including: a step of raising the second wheel from a traveling surface and causing the first wheel to be grounded on the traveling surface by changing an angle of the mounting base with respect to the traveling surface, to move the mounting base along the first horizontal direction; a step of raising the first wheel from the traveling surface and causing the second wheel to be grounded on the traveling surface by changing the angle of the mounting base with respect to the traveling surface, to move the mounting base along the second horizontal direction and stop the accommodation portion at a replacement position of the corrugating roll unit; and a step of raising the second wheel from the traveling surface and causing the first wheel to be grounded on the traveling surface by changing the angle of the mounting base with respect to the traveling surface after replacement of the corrugating roll unit is completed, to move the mounting base along the first horizontal direction and retract the mounting base from the replacement position.

Therefore, the angle of the mounting base with respect to the traveling surface is changed, so that it is possible to switch between the grounding and the separation of the first wheel and the second wheel with respect to the traveling surface, and it is not necessary to provide a movement unit at the mounting base, and thus the simplification of a structure and a cost reduction can be attained.

Further, according to still another aspect of the present invention, there is provided a corrugating roll unit transporting carriage including: a mounting base having an accommodation portion accommodating a corrugating roll unit; a first wheel that is provided at one side in a longitudinal direction of the mounting base and is capable of moving the mounting base along a first horizontal direction that is a replacement direction of the corrugating roll unit; and a second wheel that is provided at the other side in the longitudinal direction of the mounting base and is capable of moving the mounting base along a second horizontal direction intersecting the first horizontal direction.

Therefore, when the angle of the mounting base with respect to the traveling surface is changed, it is possible to switch between the grounding and the separation of the first wheel and the second wheel with respect to the traveling surface, and it is not necessary to provide a movement unit at the mounting base, and thus the simplification of a structure can and a cost reduction can be attained.

Advantageous Effects of Invention

According to the corrugating roll unit transporting apparatus and method and the corrugating roll unit transporting carriage of the present invention, it is not necessary to provide a movement unit at the mounting base, and thus the simplification of a structure and a cost reduction can be attained.

DESCRIPTION OF EMBODIMENTS

Hereinafter, a preferred embodiment of a corrugating roll unit transporting apparatus and method and a corrugating roll unit transporting carriage according to the present invention will be described in detail with reference to the accompanying drawings. The present invention is not limited to this embodiment, and in a case where there are a plurality of embodiments, the present invention also includes configurations made by combining the respective embodiments.

Figure 1:
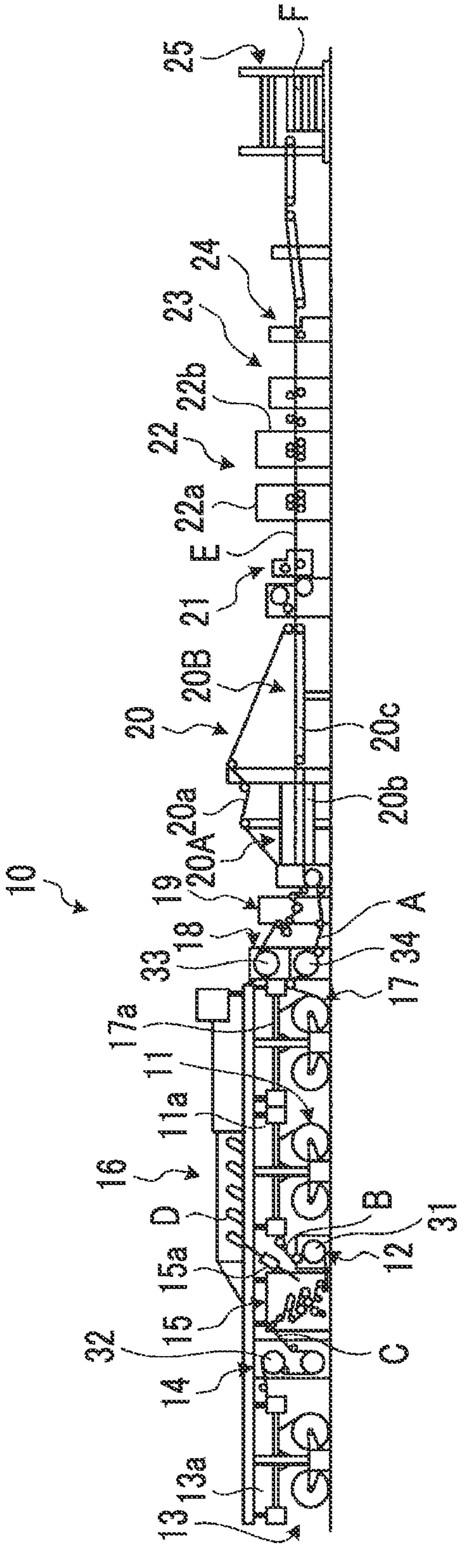
FIG. 1 is a schematic diagram showing a corrugating machine as a cardboard sheet manufacturing apparatus.

FIG. 1 is a schematic diagram showing a corrugating machine as a cardboard sheet manufacturing apparatus.

As shown in FIG. 1, a corrugating machine 10 as a cardboard sheet manufacturing apparatus is for manufacturing a single-faced cardboard sheet D by bonding a top liner C to a corrugated medium B, manufacturing a double-faced cardboard sheet E by bonding a bottom liner A to the medium B side of the manufactured single-faced cardboard sheet D, and manufacturing a sheet-like double-faced cardboard sheet F by cutting the continuous double-faced cardboard sheet E to a predetermined length.

The corrugating machine 10 includes a mill roll stand 11 and a preheater 12 for the medium B, a mill roll stand 13 and a preheater 14 for the top liner C, a single facer 15, a bridge 16, a mill roll stand 17 and a preheater 18 for the bottom liner A, a glue machine 19, a double facer 20, a rotary shear 21, a slitter scorer 22, a cutoff 23, a defective sheet rejecting device 24, and a stacker 25.

In the mill roll stand 11, rolls of paper, in each of which the medium B is wound in a roll shape, are respectively mounted on both sides, and a splicer 11*a* which performs paper splicing is provided on the upper side thereof. When the remaining of the roll of paper on one side is a small amount, the splicer 11*a* performs paper splicing of the roll of paper on the other side, so that the medium B can be continuously fed toward the downstream side from the mill roll stand 11.

In the mill roll stand 13, rolls of paper, in each of which the top liner C is wound in a roll shape, are respectively mounted on both sides, and a splicer 13*a* which performs paper splicing is provided on the upper side thereof. When the remaining of the roll of paper on one side is a small amount, the splicer 13*a* performs paper splicing of the roll of paper on the other side, so that the top liner C can be continuously fed toward the downstream side from the mill roll stand 13.

The preheaters 12 and 14 preheat the medium B and the top liner C, respectively. The preheaters 12 and 14 have preheating rolls 31 and 32 in which steam is supplied to the interior thereof, and transport the medium B and the top liner C, which are continuously fed from the mill roll stands 11 and 13, while heating them by the preheating rolls 31 and 32, so that the medium B and the top liner C are heated to a predetermined temperature.

The single facer 15 forms the single-faced cardboard sheet D by processing the medium B heated by the preheater 12 into a wave shape, then applying an adhesive to a top portion of each corrugation, and bonding the top liner C heated by the preheater 14 to the corrugated medium B. In the single facer 15, a pickup conveyor 15*a* is provided obliquely upward on the downstream side in a transfer direction. The pickup conveyor 15*a* is composed of a pair of endless belts and clamps the single-faced cardboard sheet D formed in the single facer 15 to transport it to the bridge 16. The bridge 16 temporarily retains the single-faced cardboard sheet D in order to absorb a difference in speed between the single facer 15 and the double facer 20.

In the mill roll stand 17, rolls of paper, in each of which the bottom liner A is wound in a roll shape, are respectively mounted on both sides, and a splicer 17*a* which performs paper splicing is provided on the upper side thereof. When the remaining of the roll of paper on one side is a small amount, the splicer 17*a* performs paper splicing of the roll of paper on the other side, so that the bottom liner A can be continuously fed toward the downstream side from the mill roll stand 17.

The preheater 18 preheats each of the single-faced cardboard sheet D and the bottom liner A. The preheater 18 has preheating rolls 33 and 34 in which steam is supplied to the interior thereof, and transports the single-faced cardboard sheet D and the bottom liner A, which is continuously fed from the mill roll stand 17, while heating them by the preheating rolls 33 and 34, so that the single-faced cardboard sheet D and the bottom liner A are heated to a predetermined temperature.

The glue machine 19 has adhesive equipment. The single-faced cardboard sheet D heated by the preheating roll 33 is guided into the glue machine 19 on the way, and when the single-faced cardboard sheet D passes between a rider roll and an adhesive applicator roll, an adhesive is applied to a top portion of each of the corrugations of the medium B. The single-faced cardboard sheet D with an adhesive applied thereto by the glue machine 19 is transferred to the double facer 20. Further, the bottom liner A heated by the preheating roll 34 is also transferred to the double facer 20 through the glue machine 19.

The double facer 20 is divided into a heating section 20A on the upstream side and a cooling section 20B on the downstream side along a traveling line of the single-faced cardboard sheet D and the bottom liner A. The single-faced cardboard sheet D with an adhesive applied thereto by the glue machine 19 is carried in between a pressurizing belt 20*a* and a hot plate 20*b* in the heating section 20A, and the bottom liner A is carried in between the pressurizing belt 20*a* and the hot plate 20*b* so as to overlap the medium B side of the single-faced cardboard sheet D. The single-faced cardboard sheet D and the bottom liner A are carried in between the pressurizing belt 20*a* and the hot plate 20*b*, and then integrated in a state of being overlapped up and down, and transferred toward the cooling section 20B. During this transfer, the single-faced cardboard sheet D and the bottom liner A are heated while being pressurized, so that they are bonded to each other to form the continuous double-faced cardboard sheet E. The double-faced cardboard sheet E is naturally cooled in the cooling section 20B when being clamped and transported by the pressurizing belt 20*a* and a transport belt 20*c*, and transferred to the rotary shear 21.

The rotary shear 21 cuts the entire width or a part of the double-faced cardboard sheet E in the width direction before the bonding is stabilized in an operation initial stage. The slitter scorer 22 cuts the wide double-faced cardboard sheet E along the transfer direction so as to have a predetermined width, and forms creasing lines extending in the transfer direction. The slitter scorer 22 is composed of a first slitter scorer unit 22*a* and a second slitter scorer unit 22*b* having substantially the same structure, which are arranged along the transfer direction of the double-faced cardboard sheet E. Each of the first slitter scorer unit 22*a* and the second slitter scorer unit 22*b* has a plurality of sets of upper creasing line rolls and lower creasing line rolls, which are disposed to face each other with the double-faced cardboard sheet E interposed therebetween, in the width direction, and has a plurality of sets of slitter knives, which are disposed on the lower side of the double-faced cardboard sheet E, in the width direction.

The cutoff 23 cuts the double-faced cardboard sheet E cut in the transfer direction by the slitter scorer 22, along the width direction, to form a plate-shaped double-faced cardboard sheet F having a predetermined length. The defective sheet rejecting device 24 rejects the double-faced cardboard sheet F determined to be a defective sheet by a defect detection device from a transport line. The stacker 25 stacks the non-defective double-faced cardboard sheets F and discharges them as products to the outside of the machine.

Figure 2:
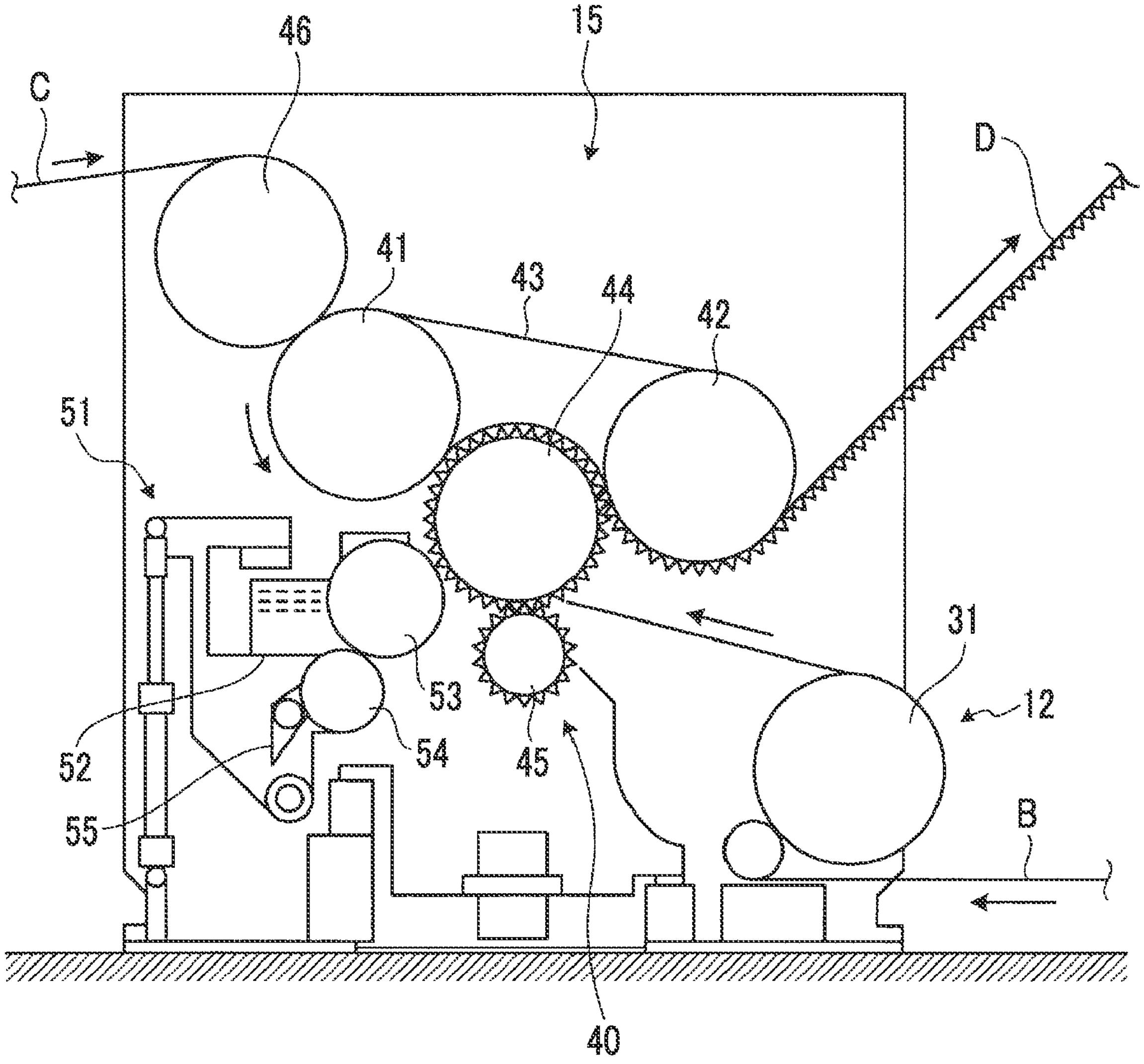
FIG. 2 is a schematic configuration diagram showing a single facer.

Here, the single facer 15 will be described in detail. FIG. 2 is a schematic configuration diagram showing the single facer.

As shown in FIG. 2, the single facer 15 includes a belt roll 41, a tension roll 42, a pressurizing belt 43, an upper corrugating roll 44, and a lower corrugating roll 45.

The belt roll 41 can be driven and rotated by a drive device (not shown). The tension roll 42 is rotatably supported with a predetermined interval between itself and the belt roll 41. The pressurizing belt 43 is an endless belt and is wound around the belt roll 41 and the tension roll 42. The upper corrugating roll 44 can be driven and rotated by a drive device (not shown), and the outer peripheral surface thereof is formed in a wave shape. The upper corrugating roll 44 is disposed below the pressurizing belt 43 between the belt roll 41 and the tension roll 42, and the outer peripheral surface having a wave shape is in contact with the lower surface of the pressurizing belt 43 in a pressurized state. The lower corrugating roll 45 has an outer peripheral surface formed in a wave shape, similar to the upper corrugating roll 44, and meshes with the outer peripheral surface of the lower corrugating roll 45 below the upper corrugating roll 44.

Therefore, the top liner C is wound around a guide roll 46 and then transferred to the nip portion between the pressurizing belt 43 and the upper corrugating roll 44 together with the pressurizing belt 43 that is guided by the belt roll 41. On the other hand, the medium B is processed into a wave shape at the meshing portion between the upper corrugating roll 44 and the lower corrugating roll 45, and then guided by the upper corrugating roll 44 to be transferred to the nip portion between the pressurizing belt 43 and the upper corrugating roll 44.

Further, the single facer 15 is provided with adhesive equipment 51. The adhesive equipment 51 is disposed in the vicinity of the upper corrugating roll 44. The adhesive equipment 51 includes an adhesive dam 52, an adhesive applicator roll 53, a meter roll 54, and an adhesive scraping blade 55.

The adhesive dam 52 stores a predetermined amount of glue. The adhesive applicator roll 53 sticks the adhesive stored in the adhesive dam 52 to the medium B that is transported by the upper corrugating roll 44 to perform adhesive application. The meter roll 54 is in contact with the outer peripheral surface of the adhesive applicator roll 53 and rotates synchronously with the adhesive applicator roll 53 to adjust the amount of adhesive stuck to the outer peripheral surface of the adhesive applicator roll 53. The adhesive scraping blade 55 is in contact with the outer peripheral surface of the meter roll 54 to scrape off excess adhesive which is removed from the adhesive applicator roll 53 and stuck to the outer peripheral surface of the meter roll 54.

Therefore, the adhesive stored in the adhesive dam 52 is stuck to the rotating adhesive applicator roll 53, and the amount of adhesive stuck to the outer peripheral surface is adjusted by the meter roll 54. In the medium B processed into a wave shape at the meshing portion between the upper corrugating roll 44 and the lower corrugating roll 45, an adhesive is applied to the top portion of each corrugation by the adhesive applicator roll 53. When the medium B with an adhesive applied thereto is transferred to the nip portion of the pressurizing belt 43 and the upper corrugating roll 44, it is bonded to the top liner C, whereby the single-faced cardboard sheet D is formed.

All the belt roll 41, the tension roll 42, the upper corrugating roll 44, and the lower corrugating roll 45 are heated by steam which flows in the interior thereof. Therefore, the top liner C is heated when it comes into contact with the belt roll 41 and the tension roll 42 through the pressurizing belt 43. The medium B is heated when it is processed into a wave shape by being pressurized at the meshing portion between the upper corrugating roll 44 and the lower corrugating roll 45. Further, the medium B is heated from this meshing portion until it overlaps the top liner C by the pressurizing belt 43 and the upper corrugating roll 44. In the medium B, an adhesive is applied to the top portion of each corrugation by the adhesive applicator roll 53 while the medium B is heated, and the medium B is transferred to the nip portion between the pressurizing belt 43 and the upper corrugating roll 44. Here, the top liner C is pressurized and joined to the medium B. The adhesive is solidified due to an adhesive force being increased by receiving a predetermined amount of heat, and the medium B and the top liner C are bonded to each other due to the adhesive receiving heat and solidifying, and the single-faced cardboard sheet D is formed.

Further, although not shown in the drawings, a pressurizing force adjusting device capable of adjusting a pressurizing force to the medium B and the top liner C by the upper corrugating roll 44 and the pressurizing belt 43 is provided. The pressurizing force adjusting device has a hydraulic cylinder, and a tip portion of a drive rod thereof is connected to a supporting shaft of the tension roll 42. Therefore, the tension of the pressurizing belt 43 is adjusted by moving the tension roll 42 toward and away from the belt roll 41 by the hydraulic cylinder, and thus the pressurizing force to the medium B and the top liner C which are transported between the upper corrugating roll 44 and the pressurizing belt 43 can be adjusted.

In the single facer 15 configured in this manner, it is necessary to form a plurality of types of mediums B having different wave shapes, and therefore, a plurality of types of upper and lower corrugating rolls 44 and 45 are provided according to the types of the mediums B to be formed. A corrugating roll unit 40 composed of the upper corrugating roll 44, the lower corrugating roll 45, and the like can be replaced with respect to the single facer 15. The corrugating roll unit 40 is composed of the upper corrugating roll 44, the lower corrugating roll 45, the adhesive equipment 51, and the like.

Figure 3:
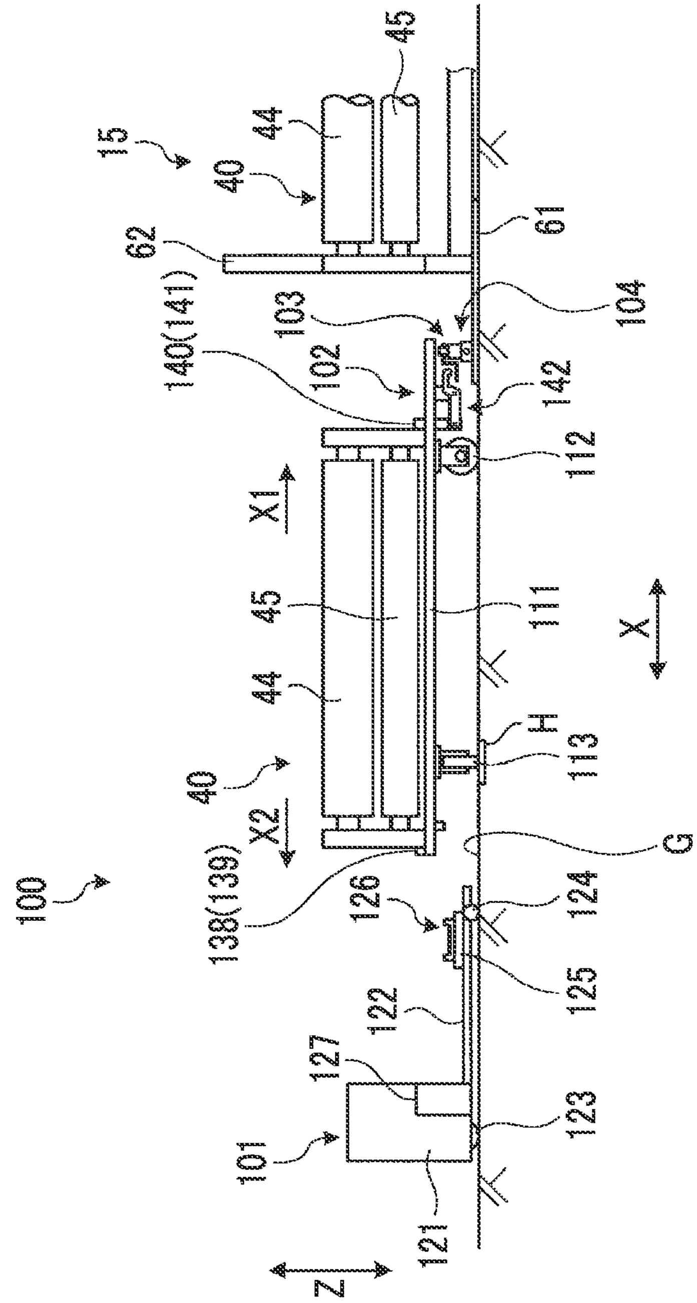
FIG. 3 is a schematic diagram showing a corrugating roll unit transporting apparatus of the present embodiment.

Hereinafter, the corrugating roll unit transporting apparatus of the present embodiment will be described. FIG. 3 is a schematic diagram showing the corrugating roll unit transporting apparatus of the present embodiment. In the following description, a first horizontal direction, which is a replacement direction of the corrugating roll unit, is set to be an X direction, a second horizontal direction intersecting the X direction that is the first horizontal direction is set to be a Y direction, and the vertical direction intersecting the X direction and the Y direction is set to be a Z direction. Although the X direction and the Y direction are set to be a horizontal direction, the X direction and the Y direction may have a predetermined inclination angle with respect to the horizontal direction. Further, the replacement direction of the corrugating roll unit is the X direction which is the first horizontal direction. However, a mounting direction of the corrugating roll unit is set to be an X1 direction, and a removal direction of the corrugating roll unit is set to be an X2 direction.

As shown in FIG. 3, a corrugating roll unit transporting apparatus 100 includes a moving carriage 101, a corrugating roll unit transporting carriage 102, a first lifting device 103, and a movement unit 104.

The moving carriage 101 can be self-propelled by an operator, and can be moved to be connected to the corrugating roll unit transporting carriage 102. The corrugating roll unit transporting carriage 102 includes a mounting base 111, a first wheel 112, and a second wheel 113. The mounting base 111 can accommodate the corrugating roll unit 40 mounted thereon. The mounting base 111 is provided with two first wheels 112 on one side (the right side in FIG. 3) in a longitudinal direction (mainly the X direction), and provided with two second wheels 113 on the other side (the left side in FIG. 3) in the longitudinal direction (mainly the X direction). The two first wheels 112 can move the mounting base 111 on a traveling surface G along the X direction which is the replacement direction of the corrugating roll unit 40. The two second wheels 113 can move the mounting base 111 on the traveling surface G along the Y direction intersecting the X direction. In this case, it is preferable that the first wheel 112 is a wheel made by mounting an elastic member such as rubber on the outer peripheral surface of an iron wheel. It is preferable that the second wheel 113 is an iron wheel and an iron plate H is laid on the traveling surface G.

The first lifting device 103 is disposed on the traveling surface G side and can raise and lower the two first wheels 112 with respect to the traveling surface G. The movement unit 104 is disposed on the traveling surface G side and can move the mounting base 111 and the first lifting device 103 along the Y direction in a state where the first wheels 112 are raised from the traveling surface G by the first lifting device 103 and the second wheels 113 are grounded on the traveling surface G.

Figure 4:
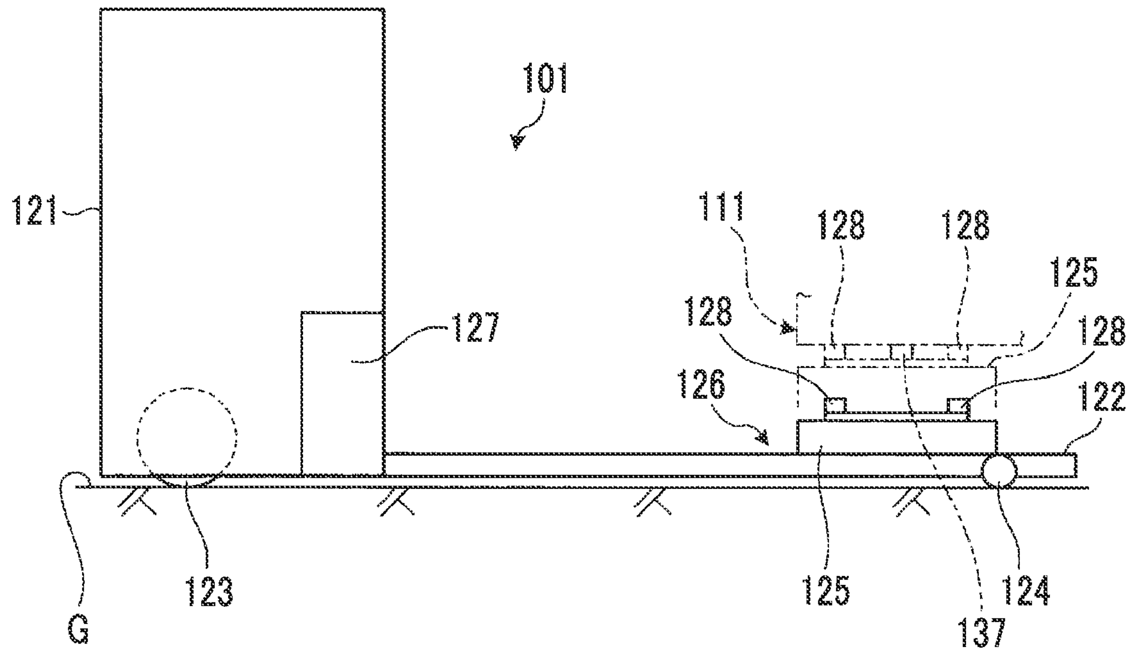
FIG. 4 is a side view showing a moving carriage.
Figure 5:
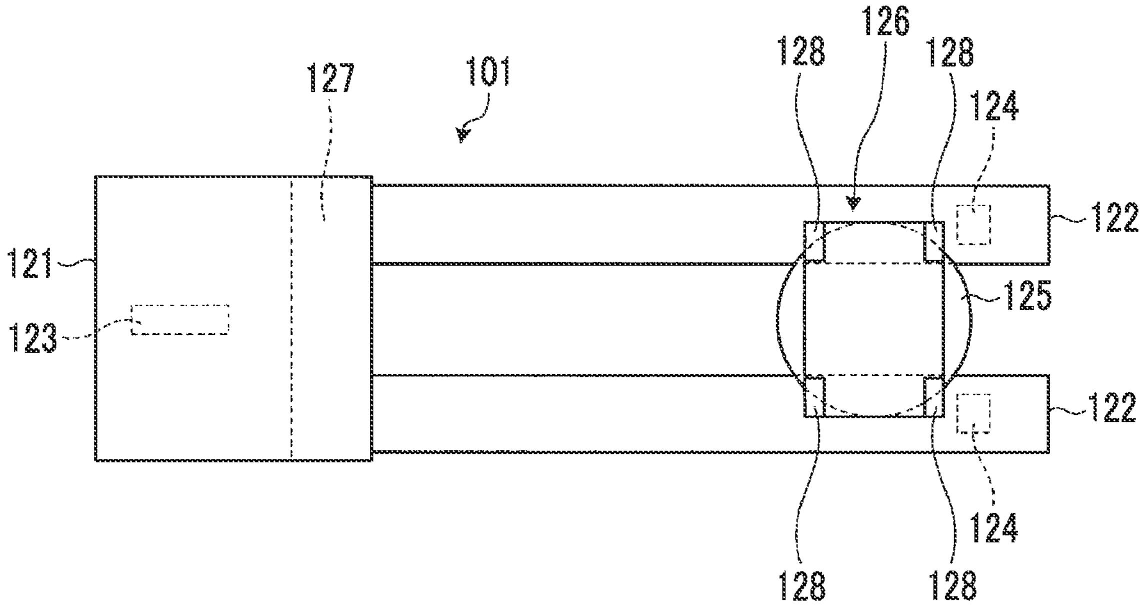
FIG. 5 is a plan view showing the moving carriage.

Hereinafter, the moving carriage 101, the corrugating roll unit transporting carriage 102, the first lifting device 103, and the movement unit 104 will be described in detail. FIG. 4 is a side view showing the moving carriage, and FIG. 5 is a plan view showing the moving carriage.

The moving carriage 101 is configured to have a fork 122 provided at a front portion of a carriage main body 121, in which a drive wheel 123 is provided at the carriage main body 121 and an auxiliary wheel 124 is provided at the fork 122. In the moving carriage 101, a turntable 125 is provided at the fork 122, and the turntable 125 can be raised and lowered by a second lifting device 126 through the fork 122. The second lifting device 126 has a lifting mechanism 127 provided in the carriage main body 121, and the lifting mechanism 127 can raise and lower the fork 122. In the turntable 125, a projection portion 128 is fixed to each of four corner portions of a substrate having a rectangular shape when viewed in a plan view.

Therefore, the moving carriage 101 can be self-propelled by the drive wheel 123 and the auxiliary wheel 124 by being operated by the operator. At this time, in the moving carriage 101, the drive wheel 123 can be steered by an operation of a steering wheel (not shown) by the operator. Further, the moving carriage 101 can move the corrugating roll unit transporting carriage 102 along the X direction in a state where the second wheels 113 of the corrugating roll unit transporting carriage 102 are raised from the traveling surface G by the second lifting device 126 and the first wheels 112 are grounded on the traveling surface G. That is, in the moving carriage 101, when the fork 122 is raised by the lifting mechanism 127 in a state where the tip portion of the fork 122 is inserted below the other side of the mounting base 111, the turntable 125 comes into contact with the lower surface of the mounting base 111 and pushes up the mounting base 111, whereby the second wheels 113 can be raised from the traveling surface G. When the moving carriage 101 is moved in this state, the corrugating roll unit transporting carriage 102 can be moved by the frictional resistance between the turntable 125 and the mounting base 111 or the locking between the projection portions 128 of the turntable 125 and a beam portion 137 (refer to FIG. 6) of the mounting base 111.

Figure 6:
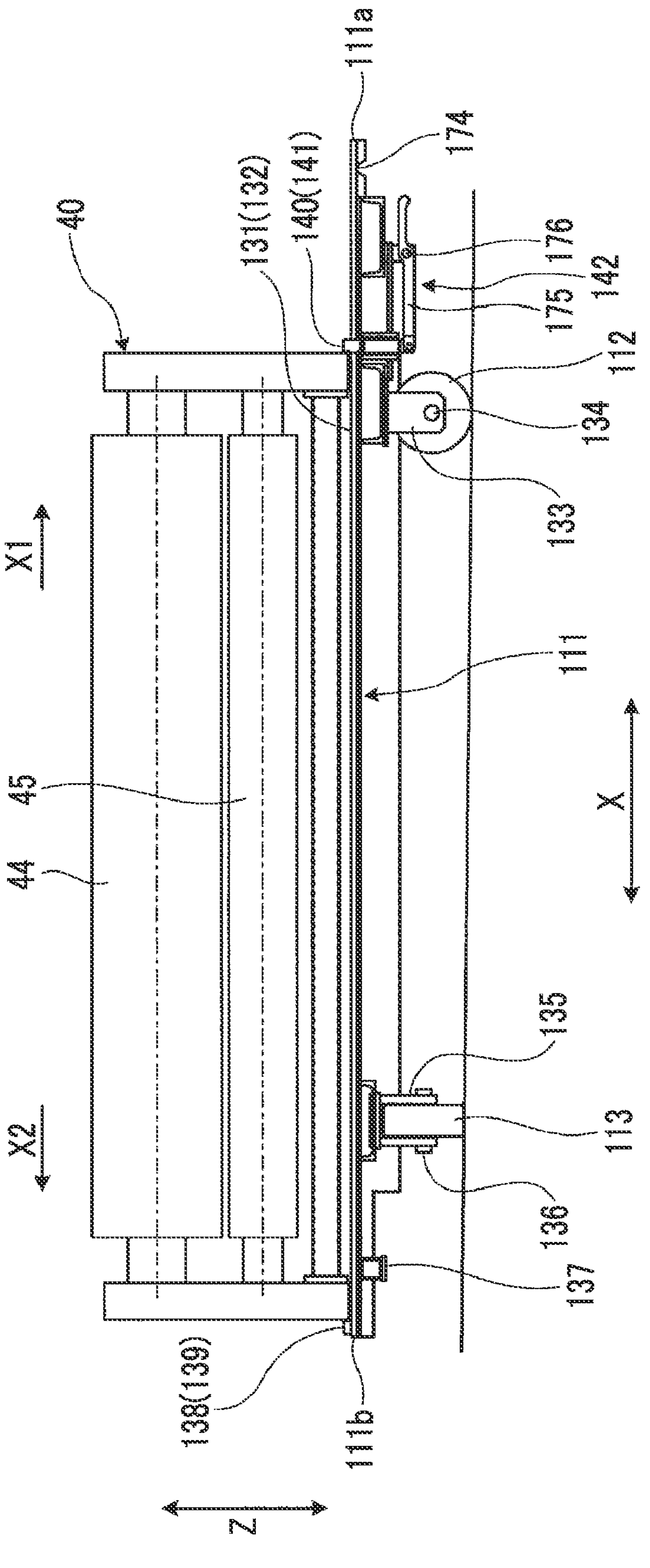
FIG. 6 is a side view showing a corrugating roll unit transporting carriage.
Figure 7:
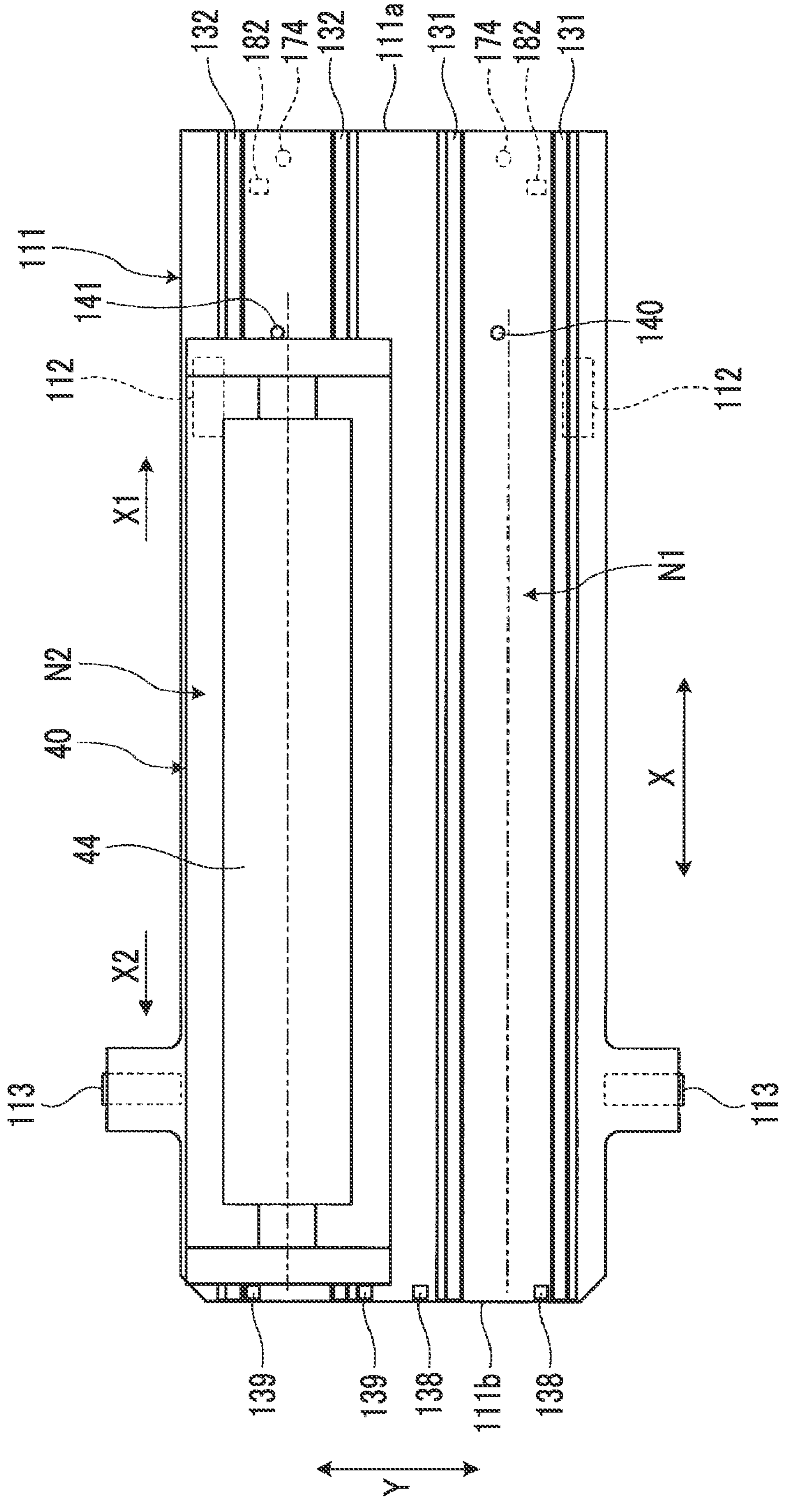
FIG. 7 is a plan view showing the corrugating roll unit transporting carriage.

FIG. 6 is a side view showing the corrugating roll unit transporting carriage, and FIG. 7 is a plan view showing the corrugating roll unit transporting carriage.

As shown in FIGS. 6 and 7, the mounting base 111 has a rectangular plate shape and has a first accommodation portion N1 that accommodates the corrugating roll unit 40 that is removed from the single facer 15, and a second accommodation portion N2 that accommodates the corrugating roll unit 40 to be mounted to the single facer 15. The mounting base 111 has a pair of guide rails 131 and 132 provided on the upper surface portion thereof to support the corrugating roll unit 40 to be movable along the X direction, at the first accommodation portion N1 and the second accommodation portion N2, respectively.

The mounting base 111 has the two first wheels 112 provided on the lower surface of one end portion 111*a* in the longitudinal direction, and the two second wheels 113 provided on the lower surface of the other end portion 111*b* in the longitudinal direction. The second wheels 113 are disposed outside the first wheel 112 in the width direction (the Y direction) of the mounting base 111. That is, the first wheels 112 are rotatably supported on a bracket 133 fixed to the lower surface of the one end portion 111*a* of the mounting base 111, by a supporting shaft 134. The second wheels 113 are rotatably supported on a bracket 135 fixed to the lower surface of the other end portion 111*b* of the mounting base 111, by a supporting shaft 136.

Further, in the mounting base 111, the beam portion 137 is fixed to the other side in the longitudinal direction from the second wheels 113 on the lower surface of the other end portion 111*b*. The beam portion 137 is disposed along the width direction of the mounting base 111. When the turntable 125 is raised by the second lifting device 126 of the moving carriage 101, as shown in FIG. 4, the upper surface of the turntable 125 comes into contact with the beam portion 137 and the projection portions 128 can be locked thereto.

Therefore, as shown in FIG. 3, when the other end portion 111*b* is lifted by the second lifting device 126 of the moving carriage 101, so that the second wheels 113 are separated from the traveling surface G, the mounting base 111 becomes movable along the X direction by the first wheels 112 (refer to FIG. 11 (described later)). On the other hand, when the one end portion 111*a* is lifted by the first lifting device 103, so that the first wheels 112 are separated from the traveling surface G, the mounting base 111 becomes movable along the Y direction by the second wheels 113 (refer to FIG. 13 (described later)).

Returning to FIGS. 6 and 7, the mounting base 111 has first stoppers 138 and 139 provided on the upper surface portions on the other side in the longitudinal direction of the guide rails 131 and 132. When the corrugating roll unit 40 is moved in the removal direction X2 along the guide rails 131 and 132 of the mounting base 111, the corrugating roll unit 40 comes into contact with the first stoppers 138 and 139, so that the movement thereof is blocked and positioning is performed. Further, the mounting base 111 has second stoppers 140 and 141 provided on one side in the longitudinal direction of the guide rails 131 and 132. When the corrugating roll unit 40 is moved in the mounting direction X1 along the guide rails 131 and 132 of the mounting base 111, the corrugating roll unit 40 comes into contact with the second stoppers 140 and 141, so that the movement thereof is blocked and positioning is performed.

The second stoppers 140 and 141 penetrate the mounting base 111 in the Z direction and are supported to be movable along the Z direction. The second stoppers 140 and 141 block the movement of the corrugating roll unit 40 in the mounting direction X1 by moving to a blocking position where the second stoppers 140 and 141 are raised along the Z direction. Further, the second stoppers 140 and 141 release the blocking of the movement in the mounting direction X1 of the corrugating roll unit 40 by moving to a release position where the second stoppers 140 and 141 are lowered along the Z direction. The movement of the second stoppers 140 and 141 is carried out by an interlocking device 142 in association with the operation of the first lifting device 103 (refer to FIG. 13 (described later)).

Figure 8:
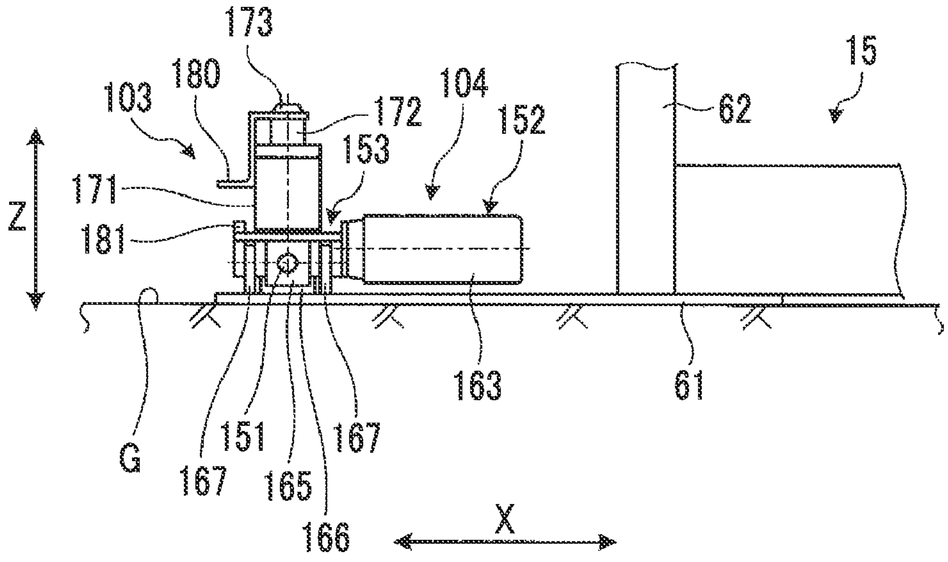
FIG. 8 is a side view showing a first lifting device and a movement unit.
Figure 9:
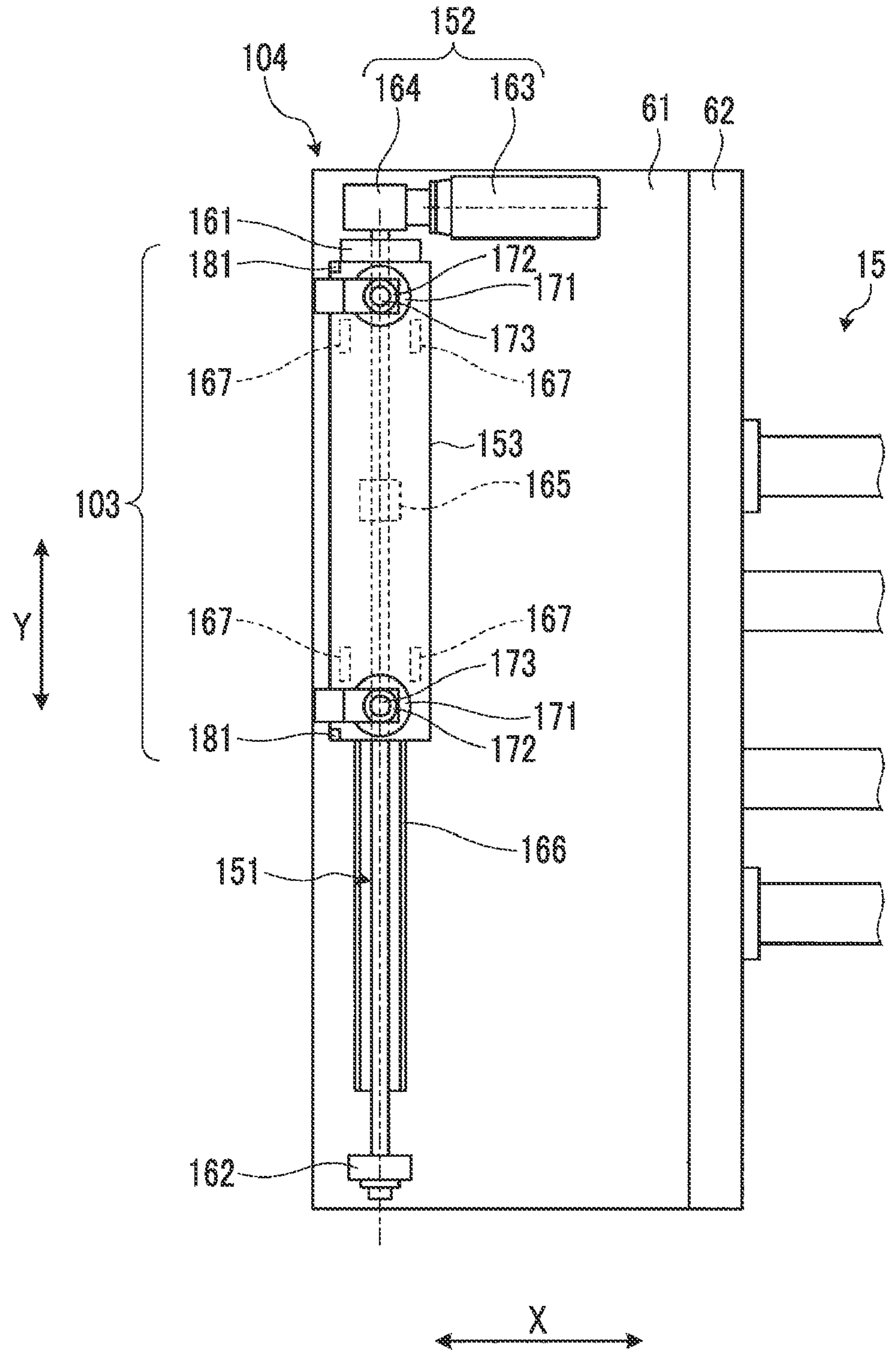
FIG. 9 is a plan view showing the first lifting device and the movement unit.
Figure 10:
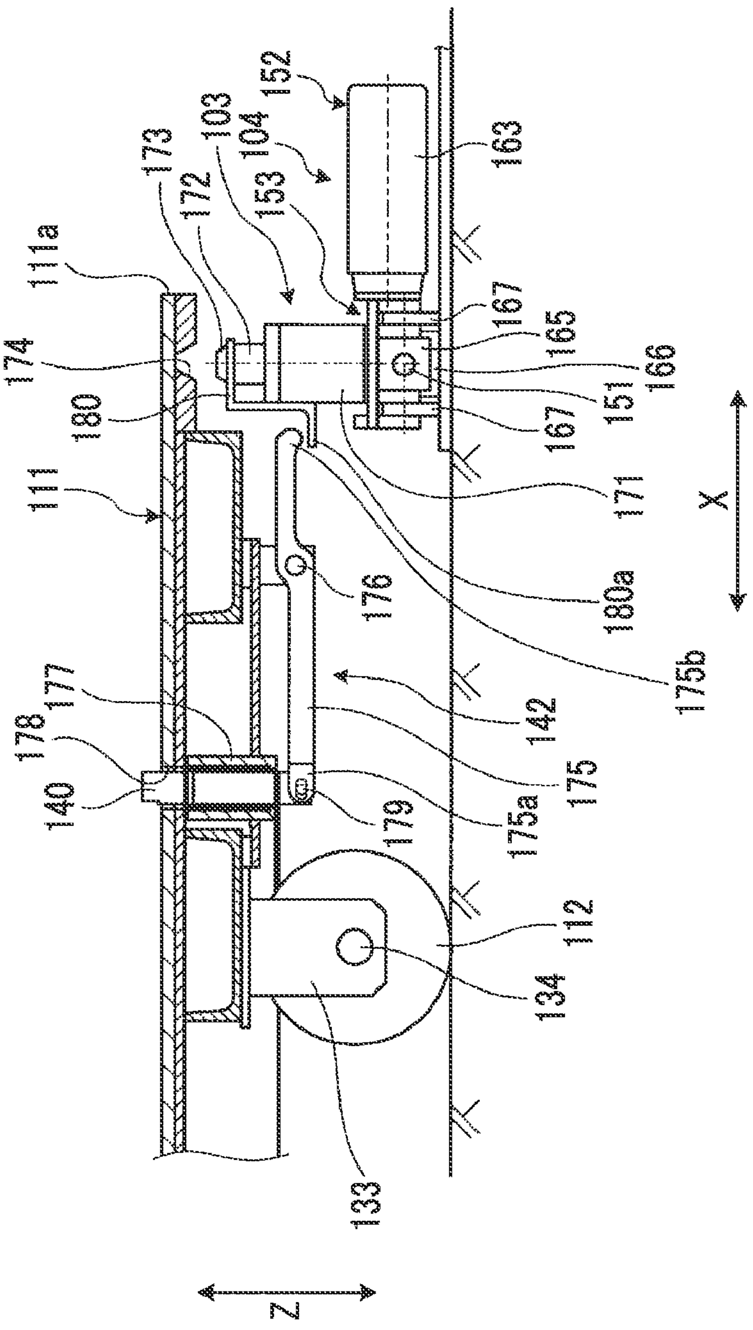
FIG. 10 is a sectional view showing the first lifting device and a second stopper.

FIG. 8 is a side view showing the first lifting device and the movement unit, FIG. 9 is a plan view showing the first lifting device and the movement unit, and FIG. 10 is a sectional view showing the first lifting device and the second stopper.

As shown in FIGS. 8 and 9, a base 61 is laid on the traveling surface G, and a frame 62 of the single facer 15 is installed on the base 61. The frame 62 is for supporting the corrugating roll unit 40 composed of the upper corrugating roll 44, the lower corrugating roll 45, and the like.

The movement unit 104 is disposed on the base 61 on the traveling surface G side. The movement unit 104 has a screw shaft 151, a rotation device 152, and a moving member 153. The screw shaft 151 is disposed along the Y direction, and the respective end portions in the axial direction are rotatably supported by bearings 161 and 162. The rotation device

152 is capable of rotating the screw shaft 151 and has a motor 163 and a driving force transmission mechanism 164. The driving force transmission mechanism 164 is, for example, a pair of bevel gears, and rotates the screw shaft 151 by transmitting the rotational force of the motor 163 to the screw shaft 151.

The moving member 153 has a plate shape long in the axial direction of the screw shaft 151, and is disposed above the screw shaft 151. A nut member 165 is fixed to the lower surface of an intermediate portion in the longitudinal direction of the moving member 153, and the screw shaft 151 is screwed to the nut member 165. The nut member 165 is supported to be movably along a guide member 166 fixed onto the base 61 along the axial direction of the screw shaft 151. Further, the moving member 153 is provided with a plurality of wheels 167 traveling on the base 61 on the lower surface thereof. Therefore, when the screw shaft 151 is rotated by the rotation device 152, the nut member 165 screwed to the screw shaft 151 moves in the axial direction of the screw shaft 151, and can move the moving member 153 along the Y direction.

The first lifting device 103 is disposed on the moving member 153 of the movement unit 104 on the traveling surface G side. The first lifting device 103 can raise and lower the first wheels 112 with respect to the traveling surface G by raising and lowering the one end portion 111*a* of the mounting base 111. The first lifting device 103 includes two fluid pressure cylinders (for example, air cylinders or hydraulic cylinders) 171, and the two fluid pressure cylinders 171 are disposed at the respective end portions in the longitudinal direction of the moving member 153. The two fluid pressure cylinders 171 have the same configuration and each has a rod 172 that moves along the Z direction. As shown in detail in FIG. 10, the rod 172 is provided with a protrusion portion 173 having a conical shape, as a locking portion, at the tip portion thereof. On the other hand, the mounting base 111 is provided with a recessed portion 174 having a conical shape, as a locked portion, to which the protrusion portion 173 is fitted and locked, on the lower surface of the one end portion 111*a*.

The interlocking device 142 moves the second stoppers 140 and 141 to a blocking position where the second stoppers 140 and 141 block the movement of the corrugating roll unit 40 and a release position where the second stoppers 140 and 141 release the blocking of the movement of the corrugating roll unit 40, according to the operation of the first lifting device 103. The interlocking device 142 has a link 175 that transmits the operating force of the first lifting device 103 to the second stoppers 140 and 141. The intermediate portion of the link 175 is rotatably supported by a supporting shaft 176 extending along the Y direction on the lower portion of the mounting base 111. The second stoppers 140 and 141 are supported to be movable in the Z direction by a supporting cylinder 177 at the lower portion of the mounting base 111, and the upper end portions thereof can protrude upward through through-holes 178 of the mounting base 111. The upper end portions of the second stoppers 140 and 141 are biased toward the upper side of the mounting base 111 by the biasing force of a biasing member (for example, a spring) (not shown).

One end portion 175*a* in the longitudinal direction of the link 175 is rotatably connected to the lower end portions of the second stoppers 140 and 141 by a connection shaft 179. An end portion of a pushing-up member 180 is fixed to the rod 172 of the fluid pressure cylinder 171. The pushing-up member 180 has a Z shape, and a horizontal pushing-up portion 180*a* is located below the other end portion 175*b* of the link 175.

Therefore, when the rod 172 of the fluid pressure cylinder 171 is in a contracted state, the protrusion portion 173 is separated from the recessed portion 174 and is not fitted thereto, and the first wheels 112 are grounded on the traveling surface G. At this time, the second stoppers 140 and 141 are located at the blocking position where the upper end portions of the second stoppers 140 and 141 protrude upward from the mounting base 111 due to the biasing force of the biasing member, and the movement of the corrugating roll unit 40 is blocked. When the rod 172 of the fluid pressure cylinder 171 is extended, the protrusion portion 173 is fitted and locked to the recessed portion 174, and the first lifting device 103 and the mounting base 111 are integrally connected. When the rod 172 of the fluid pressure cylinder 171 is extended, the protrusion portion 173 pushes up the one end portion 111*a* of the mounting base 111 through the recessed portion 174, and raises the first wheels 112 to separate them from the traveling surface G. At this time, the pushing-up member 180 also rises together with the rod 172, and the pushing-up portion 180*a* pushes up the other end portion 175*b* to rotate the link 175. When the link 175 is rotated, the one end portion 175*a* is lowered, the second stoppers 140 and 141 are lowered against the biasing force of the biasing member, the upper end portions of the second stoppers 140 and 141 are drawn below the mounting base 111, and the blocking of the movement of the corrugating roll unit 40 is released.

Further, as shown in FIGS. 7 to 9, the movement unit 104 has two stop switches 181 for stopping the first lifting device 103 with respect to the mounting base 111 in the Y direction at a raising and lowering position set in advance. The stop switch 181 is fixed to each end portion in the longitudinal direction of the moving member 153. On the other hand, the mounting base 111 has two detection portions 182 provided on the lower surface of the one end portion 111*a*. The distance in the Y direction between the two stop switches 181 and the distance in the Y direction between the two detection portions 182 are the same. Therefore, when the mounting base 111 moves in the X direction and comes into contact with a stopper (not shown) to stop at a predetermined position, the stop switch 181 tries to detect the detection portion 182. At this time, when the stop switch 181 cannot detect the detection portion 182, the movement unit 104 moves the moving member 153 to one side or the other side in the Y direction. Here, when the two stop switches 181 respectively detect the detection portions 182, the movement unit 104 stops the movement of the moving member 153. The stop position of the moving member 153 is a position where the protrusion portion 173 of the rod 172 of the fluid pressure cylinder 171 and the recessed portion 174 of the mounting base 111 coincide with each other in the X direction and the Y direction.

Figure 13:
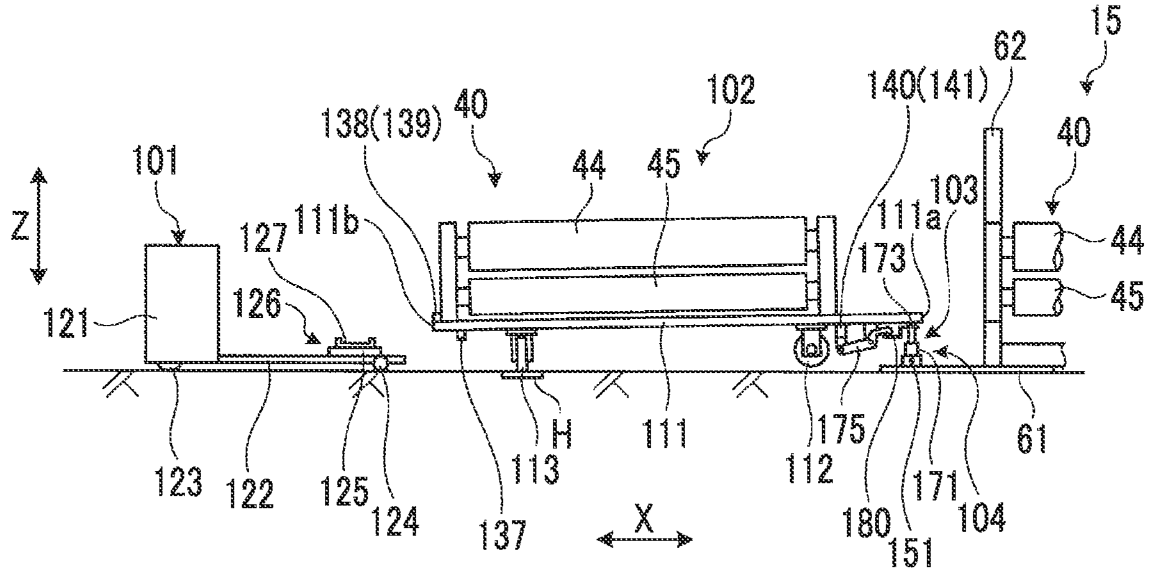
FIG. 13 is a side view showing the operation of the corrugating roll unit transporting carriage by the first lifting device and the movement unit.
Figure 14:
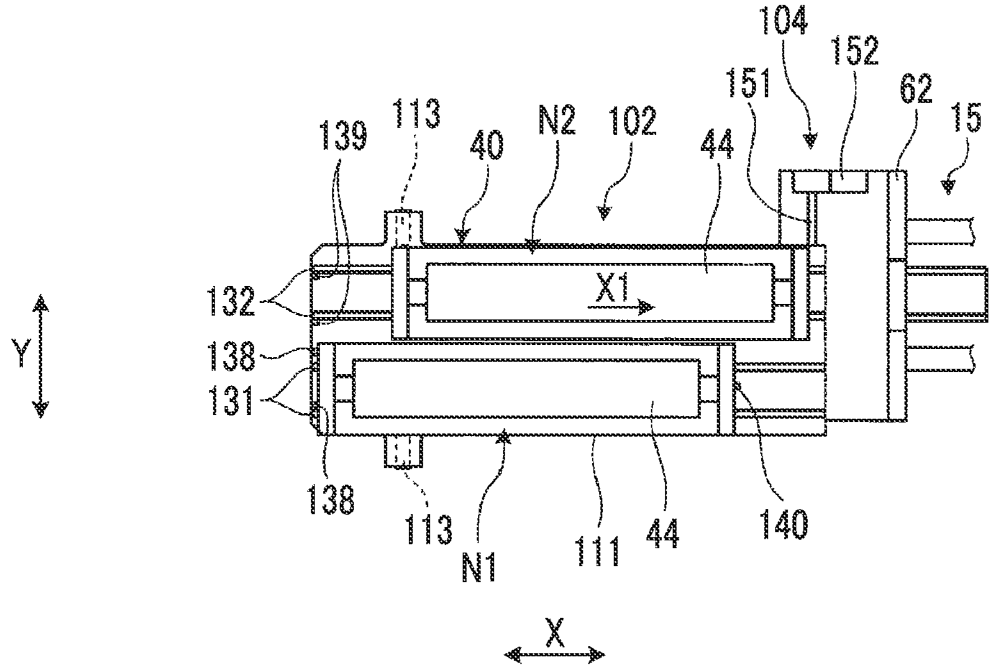
FIG. 14 is a plan view showing the corrugating roll unit transporting carriage and showing a method of replacing a corrugating roll unit.

Here, a method of transporting and a method of replacing the corrugating roll unit by the corrugating roll unit transporting apparatus 100 of the present embodiment will be described. FIG. 11 is a side view showing the operation of the corrugating roll unit transporting carriage by the moving carriage, FIG. 12 is a plan view showing the operation of the corrugating roll unit transporting carriage by the moving carriage, FIG. 13 is a side view showing the operation of the corrugating roll unit transporting carriage by the first lifting device and the movement unit, and FIG. 14 is a plan view showing the corrugating roll unit transporting carriage and showing the method of replacing the corrugating roll unit.

The method of transporting the corrugating roll unit by the corrugating roll unit transporting apparatus 100 of the present embodiment includes a step of raising the second wheels 113 from the traveling surface G by changing the angle of the mounting base 111 with respect to the traveling surface G, and causing the first wheels 112 to be grounded on the traveling surface G to move the mounting base 111 along the X direction, a step of raising the first wheels 112 from the traveling surface G by changing the angle of the mounting base 111 with respect to the traveling surface G, and causing the second wheels 113 to be grounded on the traveling surface G to move the mounting base 111 along the Y direction and stop the accommodation portions N1 and N2 at a replacement position of the corrugating roll unit 40, and a step of raising the second wheels 113 from the traveling surface G by changing the angle of the mounting base 111 with respect to the traveling surface G after the replacement of the corrugating roll unit 40 is completed, and causing the first wheels 112 to be grounded on the traveling surface G to move the mounting base 111 along the X direction and retract the mounting base 111 from the replacement position.

Figure 11:
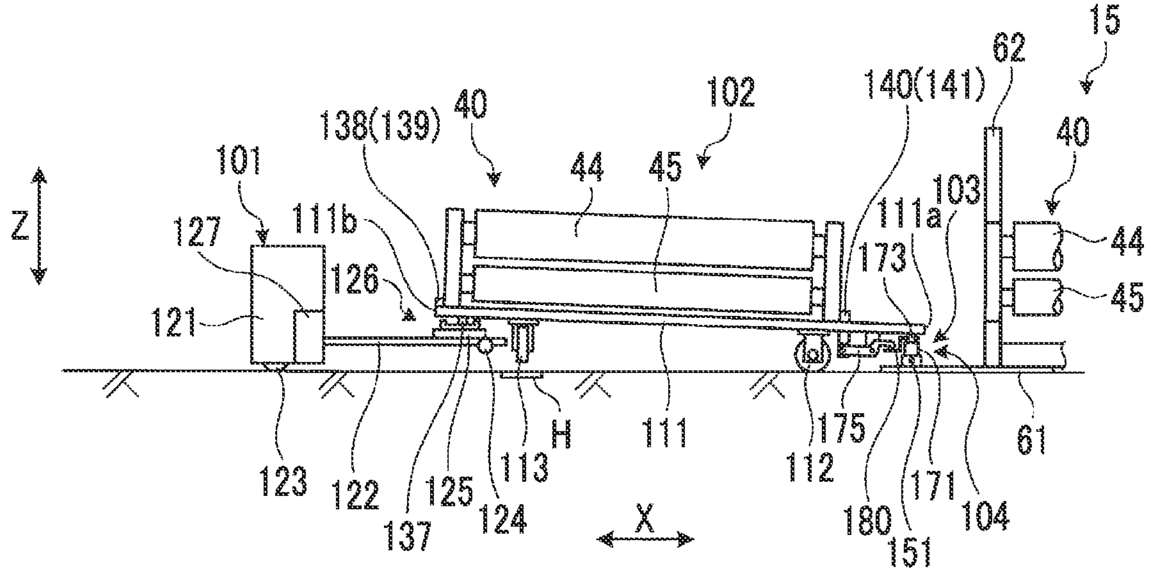
FIG. 11 is a side view showing an operation of the corrugating roll unit transporting carriage by the moving carriage.
Figure 12:
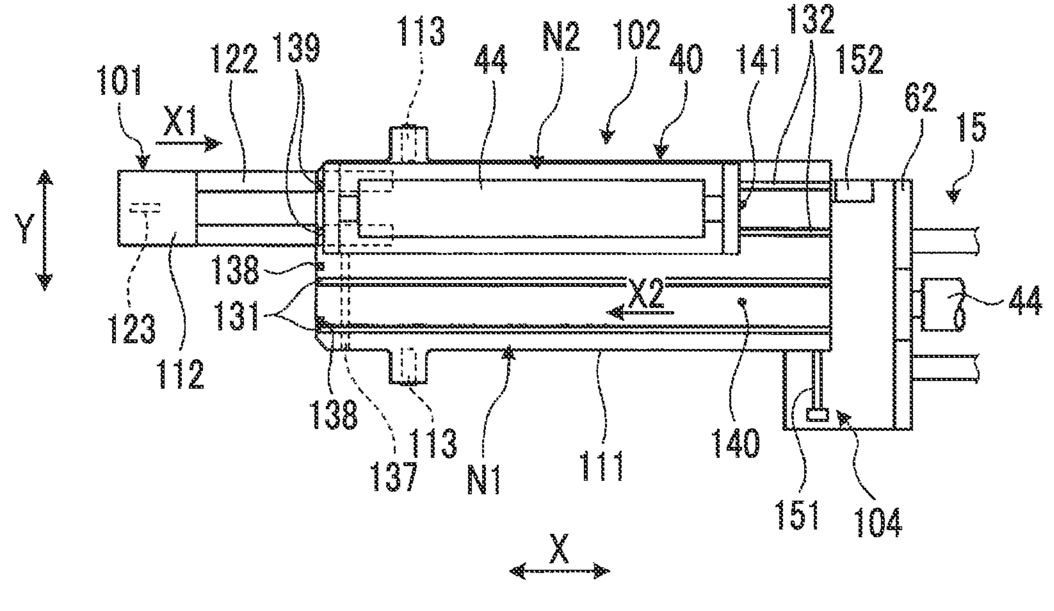
FIG. 12 is a plan view showing the operation of the corrugating roll unit transporting carriage by the moving carriage.

As shown in FIGS. 11 and 12, in the corrugating roll unit transporting carriage 102, the first accommodation portion N1 of the mounting base 111 is empty, and the corrugating roll unit 40 to be newly mounted is accommodated in the second accommodation portion N2. At this time, the corrugating roll unit transporting carriage 102 is in a backward tilted state where the one end portion 111*a* side of the mounting base 111 approaches the traveling surface G. The operator operates the moving carriage 101 to move it, and stops the moving carriage 101 in a state where the tip portion of the fork 122 is inserted below the other end portion 111*b* of the mounting base 111. Here, the turntable 125 is raised together with the fork 122 to be brought into contact with the lower surface of the mounting base 111 and push up the mounting base 111 to raise the second wheels 113 to a predetermined height from the traveling surface G. That is, the other end portion 111*b* of the mounting base 111 is raised through the turntable 125 by the second lifting device 126, so that the angle of the mounting base 111 with respect to the traveling surface G is changed and the second wheels 113 are separated from the traveling surface G. At this time, the mounting base 111 of the corrugating roll unit transporting carriage 102 enters a horizontal state. Then, the operator moves the moving carriage 101 to move the corrugating roll unit transporting carriage 102 together with the moving carriage 101 in the mounting direction X1 and stop the corrugating roll unit transporting carriage 102 at a predetermined position.

Here, the operator operates the moving carriage 101 to lower the turntable 125 together with the fork 122 and separate the turntable 125 from the lower surface of the mounting base 111, so that the second wheels 113 are lowered and grounded on the iron plate H laid on the traveling surface G. Thereafter, the operator operates the moving carriage 101 to move it, thereby separating the moving carriage 101 from the corrugating roll unit transporting carriage 102.

When the corrugating roll unit transporting carriage 102 stops at a position close to the single facer 15, the operator operates the movement unit 104. When the corrugating roll unit transporting carriage 102 stops at a predetermined position in the X direction, as shown in FIGS. 7 to 9, the stop switch 181 of the movement unit 104 tries to detect the detection portion 182 of the mounting base 111. Here, when the stop switch 181 cannot detect the detection portion 182, the movement unit 104 moves the moving member 153 to one side or the other side in the Y direction. Then, when the stop switch 181 detects the detection portion 182, the movement unit 104 stops the movement of the moving member 153. Then, the protrusion portion 173 of the fluid pressure cylinder 171 of the first lifting device 103 and the recessed portion 174 of the mounting base 111 coincide with each other in the X direction and the Y direction.

As shown in FIG. 13, the operator operates the first lifting device 103. Then, the rod 172 of the fluid pressure cylinder 171 is extended, and the protrusion portion 173 is fitted and locked to the recessed portion 174 of the mounting base 111, and then the protrusion portion 173 pushes up the one end portion 111*a* of the mounting base 111 through the recessed portion 174, so that the first wheels 112 are raised and separated from the traveling surface G. At this time, the pushing-up member 180 rises together with the rod 172 and rotates the link 175, so that the second stoppers 140 and 141 are lowered and the blocking of the movement of the corrugating roll unit 40 is released. The corrugating roll unit transporting carriage 102 enters a forward tilted state where the other end portion 111*b* side of the mounting base 111 approaches the traveling surface G.

The operator operates the movement unit 104. Then, the screw shaft 151 is rotated by the rotation device 152, the nut member 165 screwed to the screw shaft 151 moves in the axial direction of the screw shaft 151, and the moving member 153 moves along the Y direction. Since the first lifting device 103 is mounted on the moving member 153 and the mounting base 111 is connected thereto, when the moving member 153 moves along the Y direction, the mounting base 111 also moves in the Y direction by the second wheels 113. At this time, since the second wheels 113, which are iron wheels, rotate on the iron plate H laid on the traveling surface G, the frictional resistance which is applied to the movement in the Y direction is reduced. Then, in the Y direction, the first accommodation portion N1 of the mounting base 111 stops at a first replacement position where the first accommodation portion N1 faces the existing corrugating roll unit 40.

The first replacement position is a position where in the corrugating roll unit transporting carriage 102, the first accommodation portion N1 of the mounting base 111 faces the existing corrugating roll unit 40 in the X direction, the Y direction, and the Z direction. At the first replacement position of the mounting base 111, the existing corrugating roll unit 40 is moved in the removal direction X2 by a unit replacement mechanism (not shown) and accommodated in the first accommodation portion N1. Although is not described in detail, the unit replacement mechanism is provided on the single facer 15 side and is for moving the corrugating roll unit 40 between the frame 62 of the single facer 15 and the corrugating roll unit transporting carriage 102.

When the existing corrugating roll unit 40 is accommodated in the first accommodation portion N1 of the mounting base 111, the operator operates the movement unit 104, as shown in FIG. 14. Then, the mounting base 111 moves along the Y direction, and the mounting base 111 is stopped at a second replacement position where the second accommodation portion N2 of the mounting base 111 faces the empty space where the existing corrugating roll unit 40 has been removed, in the Y direction.

The second replacement position is a position where in the corrugating roll unit transporting carriage 102, the second accommodation portion N2 of the mounting base 111 faces the empty space of the single facer 15 in the X direction, the Y direction, and the Z direction. At the second replacement position of the mounting base 111, the corrugating roll unit 40 in the second accommodation portion N2 is moved in the mounting direction X1 by the unit replacement mechanism (not shown) and mounted in the empty space. Here, when the operation of replacing the corrugating roll unit 40 is completed, the operator operates the first lifting device 103, as shown in FIG. 3. Then, the rod 172 of the fluid pressure cylinder 171 is contracted, the protrusion portion 173 is lowered and removed from the recessed portion 174 of the mounting base 111, and the first wheels 112 are lowered and grounded on the traveling surface G. At this time, the pushing-up member 180 is lowered together with the rod 172, and the link 175 rotates, so that the second stoppers 140 and 141 are raised, and thus the movement of the corrugating roll unit 40 is blocked.

The operator operates the moving carriage 101 to move it, and stops the moving carriage 101 in a state where the tip portion of the fork 122 is inserted below the other end portion 111*b* of the mounting base 111. Here, the turntable 125 is raised together with the fork 122 to be brought into contact with the lower surface of the mounting base 111 and push up the mounting base 111 to raise the second wheels 113 to a predetermined height from the traveling surface G. Then, the operator moves the moving carriage 101 to move the corrugating roll unit transporting carriage 102 together with the moving carriage 101 in the removal direction X2 and retract the corrugating roll unit transporting carriage 102.

In this manner, the corrugating roll unit transporting apparatus of the present embodiment includes the mounting base 111 having the accommodation portions N1 and N2 accommodating the corrugating roll unit 40, the first wheels 112 capable of moving the mounting base 111 along the X direction (the first horizontal direction) that is the replacement direction of the corrugating roll unit 40, the second wheels 113 capable of moving the mounting base 111 along the Y direction (the second horizontal direction) intersecting the X direction, the first lifting device 103 capable of raising and lowering the first wheels 112 with respect to the traveling surface G, and the movement unit 104 that is disposed on the traveling surface G side and is capable of moving the mounting base 111 and the first lifting device 103 along the Y direction in a state where the first wheels 112 are raised from the traveling surface G by the first lifting device 103 and the second wheels 113 are grounded on the traveling surface G.

Therefore, the movement unit 104 can move the mounting base 111 and the first lifting device 103 along the Y direction in a state where the first wheels 112 are raised from the traveling surface G by the first lifting device 103 and the second wheels 113 are grounded on the traveling surface G. Therefore, it is not necessary to provide a movement unit at the mounting base 111, and thus the simplification of a structure and a cost reduction can be attained.

In the corrugating roll unit transporting apparatus of the present embodiment, the first wheels 112 are provided at the one end portion 111*a* of the mounting base 111, the second wheels 113 are provided at the other end portion 111*b* of the mounting base 111, and the first lifting device 103 raises and lowers the one end portion 111*a* of the mounting base 111, so that the first wheels 112 can be raised and lowered with respect to the traveling surface G. Therefore, it is possible to move the mounting base 111 and the first lifting device 103 along the Y direction by the second wheels 113 grounded on the traveling surface G.

In the corrugating roll unit transporting apparatus of the present embodiment, the first lifting device 103 is the fluid pressure cylinder 171 having the rod 172 that moves along the Z direction, and the protrusion portion 173 as a locking portion is provided at the tip portion of the rod 172, while the recessed portion 174 as a locked portion to which the protrusion portion 173 is locked is provided in the mounting base 111. Therefore, when the fluid pressure cylinder 171 is operated, so that the rod 172 is raised, the protrusion portion 173 is locked to the recessed portion 174 of the mounting base 111, so that the first wheels 112 are separated from the traveling surface G, and the first lifting device 103 and the mounting base 111 are integrally connected, and thus it is possible to move the mounting base 111 and the first lifting device 103 along the Y direction by the second wheels 113.

In the corrugating roll unit transporting apparatus of the present embodiment, the locking portion is the protrusion portion 173 having a conical shape, and the locked portion is the recessed portion 174 having a conical shape, into which the protrusion portion 173 is fitted. Therefore, even if the positional relationship between the fluid pressure cylinder 171 and the mounting base 111 is deviated in the X direction or the Y direction, the positional deviation is absorbed by the protrusion portion 173 and the recessed portion 174 each having a conical shape, so that the first lifting device 103 and the mounting base 111 can be appropriately connected.

In the corrugating roll unit transporting apparatus of the present embodiment, the movement unit 104 has the screw shaft 151 that is disposed along the Y direction and rotatably supported, the rotation device 152 that can rotate the screw shaft 151, and the moving member 153 that moves along the Y direction by the rotation of the screw shaft 151, and the first lifting device 103 is provided at the moving member 153. Therefore, when the screw shaft 151 is rotated by the rotation device 152, the moving member 153 moves along the Y direction, so that the first lifting device 103 provided at the moving member 153 moves along the Y direction, and the mounting base 111 connected to the first lifting device 103 can be moved along the Y direction.

In the corrugating roll unit transporting apparatus of the present embodiment, the movement unit 104 has the stop switch 181 that stops the first lifting device 103 with respect to the mounting base 111 in the Y direction at a raising and lowering position set in advance. Therefore, since the movement unit 104 stops the first lifting device 103 with respect to the mounting base 111 at the raising and lowering position by the stop switch 181, the first lifting device 103 can appropriately raise and lower the mounting base 111.

In the corrugating roll unit transporting apparatus of the present embodiment, the first stoppers 138 and 139 that block the movement of the corrugating roll unit 40 are provided at the other end portion 111*b* of the mounting base 111, the second stoppers 140 and 141 that can block the movement of the corrugating roll unit 40 are provided at the one end portion 111*a* of the mounting base 111, and the interlocking device 142 that moves the second stoppers 140 and 141 to the blocking position where the second stoppers 140 and 141 block the movement of the corrugating roll unit 40 and the release position where the second stoppers 140 and 141 release the blocking of the movement of the corrugating roll unit 40, according to the operation of the first lifting device 103, is provided. Therefore, coming-off of the corrugating roll unit 40 mounted on the mounting base 111 can be prevented by the first stoppers 138 and 139 and the second stoppers 140 and 141. Further, the second stoppers 140 and 141 can be moved between the blocking position and the release position by the interlocking device 142 according to the operation of the first lifting device 103, and at the time of the replacement of the corrugating roll unit 40, it is not necessary to move the second stoppers 140 and 141 by another operation, and thus workability can be improved.

In the corrugating roll unit transporting apparatus of the present embodiment, the interlocking device 142 has the link 175, in which an intermediate portion in the longitudinal direction is rotatably supported, and which transmits the operating force of the first lifting device 103 to the second stoppers 140 and 141, and when the first wheels 112 are grounded on the traveling surface G by the first lifting device 103, the second stoppers 140 and 141 move to the blocking position, and when the first wheels 112 are separated from the traveling surface G by the first lifting device 103, the link 175 rotates, so that the second stoppers 140 and 141 move to the release position. Therefore, it is possible to move the second stoppers 140 and 141 to the blocking position and the release position with a simple configuration, and thus the simplification of a structure can be attained.

In the corrugating roll unit transporting apparatus of the present embodiment, the corrugating roll unit transporting apparatus further includes the second lifting device 126 capable of raising and lowering the second wheels 113 with respect to the traveling surface G, and the moving carriage 101 that can move the mounting base 111 along the X direction in a state where the second wheels 113 are raised from the traveling surface G by the second lifting device 126 and the first wheels 112 are grounded on the traveling surface G. Therefore, the moving carriage 101 is self-propelled with the second wheels 113 raised from the traveling surface G by the second lifting device 126, so that it is possible to move the mounting base 111 along the X direction by the first wheels 112, and it is not necessary to provide a movement unit at the mounting base 111, and thus the simplification of a structure and a cost reduction can be attained.

Further, the method of transporting the corrugating roll unit of the present embodiment includes a step of raising the second wheels 113 from the traveling surface G by changing the angle of the mounting base 111 with respect to the traveling surface G, and causing the first wheels 112 to be grounded on the traveling surface G to move the mounting base 111 along the X direction, a step of raising the first wheels 112 from the traveling surface G by changing the angle of the mounting base 111 with respect to the traveling surface G, and causing the second wheels 113 to be grounded on the traveling surface G to move the mounting base 111 along the Y direction and stop the accommodation portions N1 and N2 at a replacement position of the corrugating roll unit 40, and a step of raising the second wheels 113 from the traveling surface G by changing the angle of the mounting base 111 with respect to the traveling surface G after the replacement of the corrugating roll unit 40 is completed, and causing the first wheels 112 to be grounded on the traveling surface G to move the mounting base 111 along the X direction and retract the mounting base 111 from the replacement position. Therefore, when the angle of the mounting base 111 with respect to the traveling surface G is changed, it is possible to switch between the grounding and the separation of the first wheels 112 and the second wheels 113 with respect to the traveling surface G, and it is not necessary to provide a movement unit at the mounting base 111, and thus the simplification of a structure and a cost reduction can be attained.

Further, the corrugating roll unit transporting carriage of the present embodiment includes the mounting base 111 having the accommodation portions N1 and N2 accommodating the corrugating roll unit 40, the first wheels 112 that are provided at one side in a longitudinal direction of the mounting base 111 and is capable of moving the mounting base 111 along the X direction that is the replacement direction of the corrugating roll unit 40, and the second wheels 113 that are provided at the other side in the longitudinal direction of the mounting base 111 and are capable of moving the mounting base 111 along the Y direction intersecting the X direction. Therefore, when the angle of the mounting base 111 with respect to the traveling surface G is changed, it is possible to switch between the grounding and the separation of the first wheels 112 and the second wheels 113 with respect to the traveling surface G, and it is not necessary to provide a movement unit at the mounting base 111, and thus the simplification of a structure and a cost reduction can be attained.

In the embodiment described above, the second lifting device 126 is composed of the fork 122 and the lifting mechanism 127. However, there is no limitation to this configuration. For example, a configuration may be made in which the second lifting device is provided at the fork and only the turntable is raised and lowered by the second lifting device. Further, a configuration may be made in which the second lifting device is provided at the turntable and only the projection portions are raised and lowered by the second lifting device.

REFERENCE SIGNS LIST

10: corrugating machine (cardboard sheet manufacturing apparatus)
11: mill roll stand
12: preheater
13: mill roll stand
14: preheater
15: single facer
16: bridge
17: mill roll stand
18: preheater
19: glue machine
20: double facer
21: rotary shear
22: slitter scorer
23: cutoff
24: defective sheet rejecting device
25: stacker
40: corrugating roll unit
41: belt roll
42: tension roll
43: pressurizing belt
44: upper corrugating roll
45: lower corrugating roll
51: adhesive equipment
100: corrugating roll unit transporting apparatus
101: moving carriage
102: corrugating roll unit transporting carriage
103: first lifting device
104: movement unit
111: mounting base
112: first wheel
113: second wheel
121: carriage main body
122: fork
123: drive wheel
124: auxiliary wheel
125: turntable
126: second lifting device

127: lifting mechanism
128: projection portion
131, 132: guide rail
138, 139: first stopper
140, 141: second stopper
151: screw shaft
152: rotation device
153: moving member
163: motor
165: nut member
166: guide member
171: fluid pressure cylinder
172: rod
173: protrusion portion (locking portion)
174: recessed portion (locked portion)
175: link
180: pushing-up member
181: stop switch
182: detection portion
A: bottom liner
B: medium
C: top liner
D: single-faced cardboard sheet
E, F: double-faced cardboard sheet
G: traveling surface
H: iron plate
N1: first accommodation portion
N2: second accommodation portion
X1: mounting direction
X2: removal direction

The invention claimed is:

1. A corrugating roll unit transporting apparatus comprising:

a mounting base having an accommodation portion accommodating a corrugating roll unit;

a first wheel capable of moving the mounting base along a first horizontal direction that is a replacement direction of the corrugating roll unit;

a second wheel capable of moving the mounting base along a second horizontal direction intersecting the first horizontal direction;

a first lifting device capable of raising and lowering the first wheel with respect to a traveling surface; and a movement unit that is disposed on the traveling surface side and is capable of moving the mounting base and the first lifting device along the second horizontal direction in a state where the first wheel is raised from the traveling surface by the first lifting device and the second wheel is grounded on the traveling surface.

2. The corrugating roll unit transporting apparatus according to claim 1, wherein the first wheel is provided on one side in a longitudinal direction of the mounting base, the second wheel is provided on the other side in the longitudinal direction of the mounting base, and the first lifting device raises and lowers the one side in the longitudinal direction of the mounting base, so that the first wheel is capable of being raised and lowered with respect to the traveling surface.

3. The corrugating roll unit transporting apparatus according to claim 2, wherein the first lifting device is a fluid pressure cylinder having a rod that moves along a vertical direction, and a locking portion is provided at a tip portion of the rod, while a locked portion to which the locking portion is locked is provided in the mounting base.

4. The corrugating roll unit transporting apparatus according to claim 3, wherein the locking portion is a protrusion portion having a conical shape, and the locked portion is a recessed portion having a conical shape, into which the locking portion is fitted.

5. The corrugating roll unit transporting apparatus according to claim 1, wherein the movement unit includes a screw shaft that is disposed along the second horizontal direction and rotatably supported, a rotation device capable of rotating the screw shaft, and a moving member that is moved along the second horizontal direction by rotation of the screw shaft, and the first lifting device is provided at the moving member.

6. The corrugating roll unit transporting apparatus according to claim 1, wherein the movement unit has a stop switch that stops the first lifting device with respect to the mounting base at a raising and lowering position set in advance, in the second horizontal direction.

7. The corrugating roll unit transporting apparatus according to claim 1, wherein a first stopper that blocks movement of the corrugating roll unit is provided on the other side in the longitudinal direction of the mounting base, a second stopper capable of blocking the movement of the corrugating roll unit is provided on one side in the longitudinal direction of the mounting base, and an interlocking device that moves the second stopper to a blocking position where the second stopper blocks the movement of the corrugating roll unit and a release position where the second stopper releases the blocking of the movement of the corrugating roll unit, according to an operation of the first lifting device, is provided.

8. The corrugating roll unit transporting apparatus according to claim 7, wherein the interlocking device has a link, of which an intermediate portion in the longitudinal direction is rotatably supported, and which transmits an operating force of the first lifting device to the second stopper, and when the first wheel is grounded on the traveling surface by the first lifting device, the second stopper moves to the blocking position, and when the first wheel is separated from the traveling surface by the first lifting device, the link rotates, so that the second stopper moves to the release position.

9. The corrugating roll unit transporting apparatus according to claim 1, further comprising:

a second lifting device capable of raising and lowering the second wheel with respect to the traveling surface; and a moving carriage capable of moving the mounting base along the first horizontal direction in a state where the second wheel is raised from the traveling surface by the second lifting device and the first wheel is grounded on the traveling surface.

* * * * *